United States Patent
Ranganathan et al.

(10) Patent No.: US 12,197,860 B2
(45) Date of Patent: Jan. 14, 2025

(54) CONVERSATIONAL INTERACTION ENTITY TESTING

(71) Applicant: Verizon Patent and Licensing Inc., Basking Ridge, NJ (US)

(72) Inventors: Prakash Ranganathan, Tamil Nadu (IN); Saurabh Tahiliani, Noida (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 17/383,631

(22) Filed: Jul. 23, 2021

(65) Prior Publication Data

US 2023/0027936 A1  Jan. 26, 2023

(51) Int. Cl.
 *G06F 40/226* (2020.01)
 *G06F 40/35* (2020.01)
 *G06F 40/56* (2020.01)
 *G06N 20/20* (2019.01)

(52) U.S. Cl.
 CPC ............ *G06F 40/226* (2020.01); *G06F 40/35* (2020.01); *G06F 40/56* (2020.01); *G06N 20/20* (2019.01)

(58) Field of Classification Search
 CPC ........ G06F 40/226; G06F 40/35; G06F 40/56; G06N 20/20
 See application file for complete search history.

(56) References Cited

U.S. PATENT DOCUMENTS

| | | | | |
|---|---|---|---|---|
| 11,297,016 | B1* | 4/2022 | White | G10L 13/00 |
| 2018/0157638 | A1* | 6/2018 | Li | G06F 40/35 |
| 2019/0034409 | A1* | 1/2019 | Curtis | G06F 40/35 |
| 2019/0205390 | A1* | 7/2019 | Fang | G06F 16/9035 |
| 2019/0279639 | A1* | 9/2019 | Ginsberg | G06N 5/02 |
| 2019/0311039 | A1* | 10/2019 | Plant | G06F 40/56 |
| 2020/0073938 | A1* | 3/2020 | Losalka | G06F 40/295 |
| 2022/0101839 | A1* | 3/2022 | George | G06F 16/353 |
| 2022/0374909 | A1* | 11/2022 | Dunn | G06T 11/206 |

* cited by examiner

*Primary Examiner* — Bhavesh M Mehta
*Assistant Examiner* — Edward Tracy, Jr.

(57) ABSTRACT

One or more computing devices, systems, and/or methods are provided. In an example, a conversation path associated with a revised code segment of a conversational interaction entity is identified by a processor. The conversation path has a predetermined intent. A conversational phrase is generated by the processor for the conversation path. The conversational interaction entity is employed by the processor using the conversation path and the conversational phrase to generate a resultant intent. An issue report is generated by the processor for the conversational interaction entity responsive to the resultant intent not matching the predetermined intent.

20 Claims, 10 Drawing Sheets

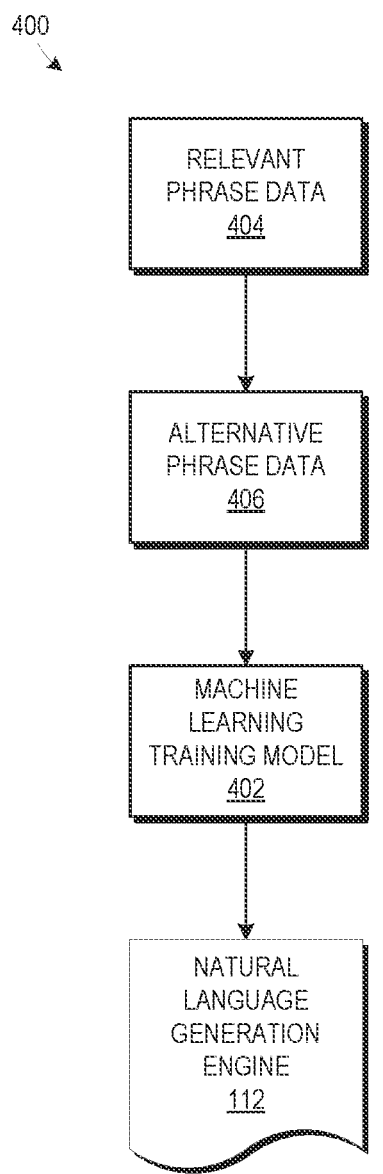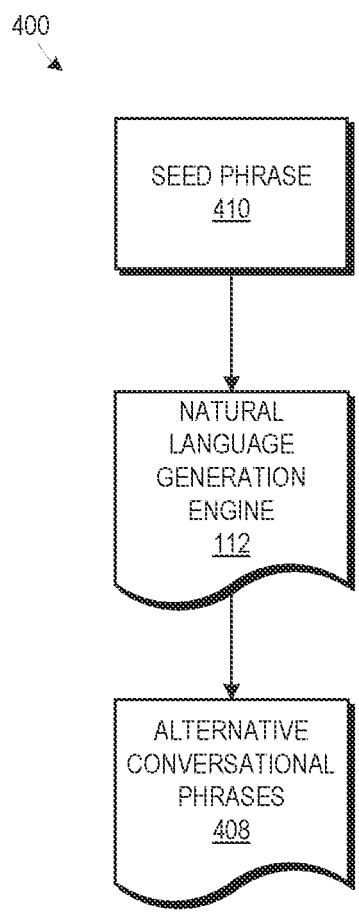
Fig. 4A
Fig. 4B

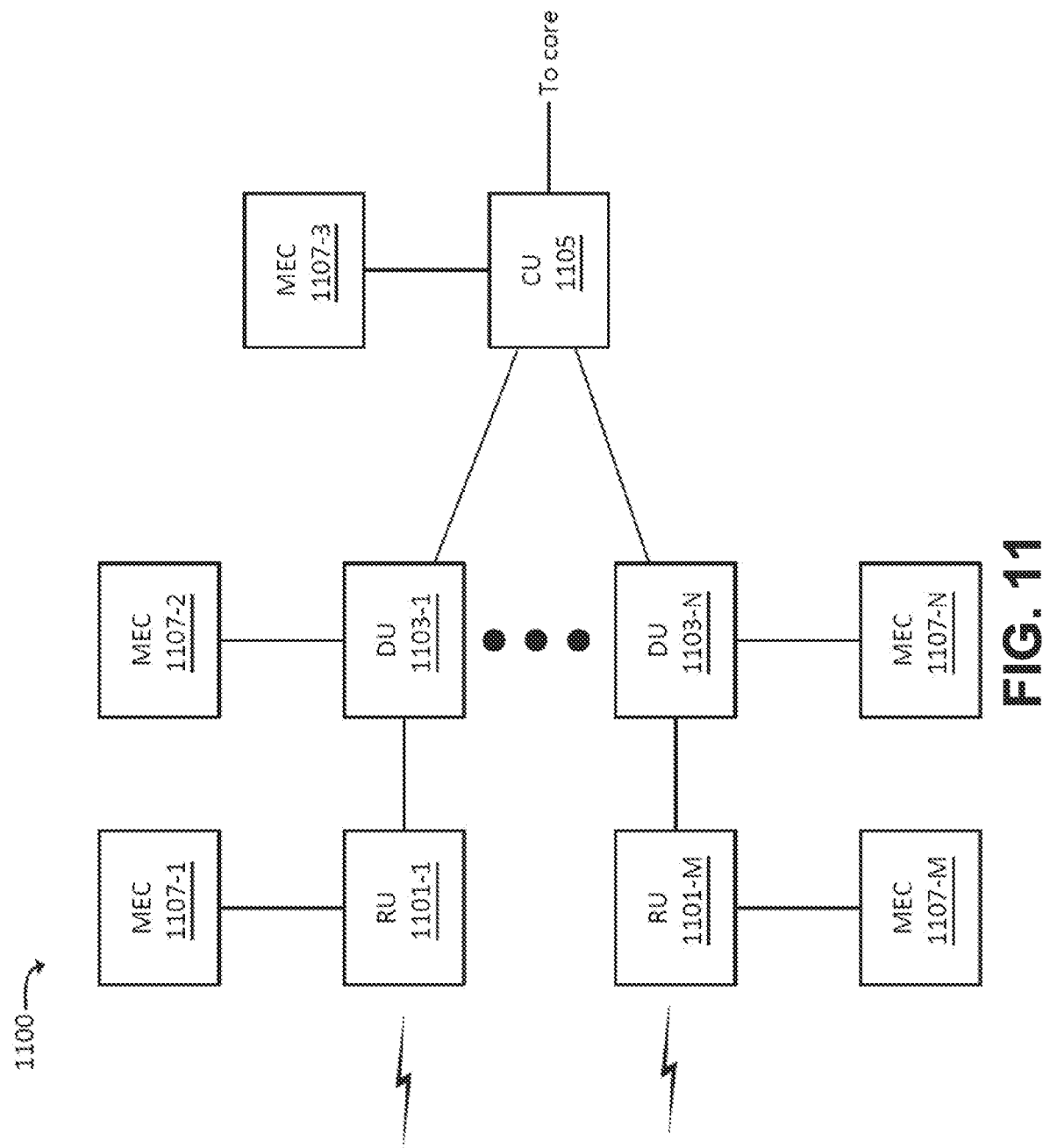

CONVERSATIONAL INTERACTION ENTITY TESTING

BACKGROUND

Organizations employ conversational interaction entities, sometime referred to as chatbots, to attempt to process user or customer requests without human interaction. The conversational interaction entity receives natural language inputs, via test or voice, and attempts to identify the intent of the customer. The goal of a conversational interaction entity is to emulate a human conversation and provide the user with the information, product, or service they desire. A conversational interaction entity may have thousands of lines of code that define conversation paths and customer intents. In addition, the conversational interaction entity may be modified frequently to encompass new offerings or to refine the conversations employed with the user. It is challenging to test and validate these changes given the large number and complexity of the conversation paths and customer intents.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 3 is a flow chart illustrating an example method for group membership detection for coordinated connectivity.

FIG. 4 is a diagram illustrating an example scenario associated with group membership management for coordinated connectivity.

FIGS. 4A-4B are component block diagrams illustrating an example system for generating alternative conversational phrases.

FIG. 11 is an illustration of an example network that may utilize and/or implement at least a portion of the techniques presented herein.

DETAILED DESCRIPTION OF EXAMPLE EMBODIMENTS

Figure 1:
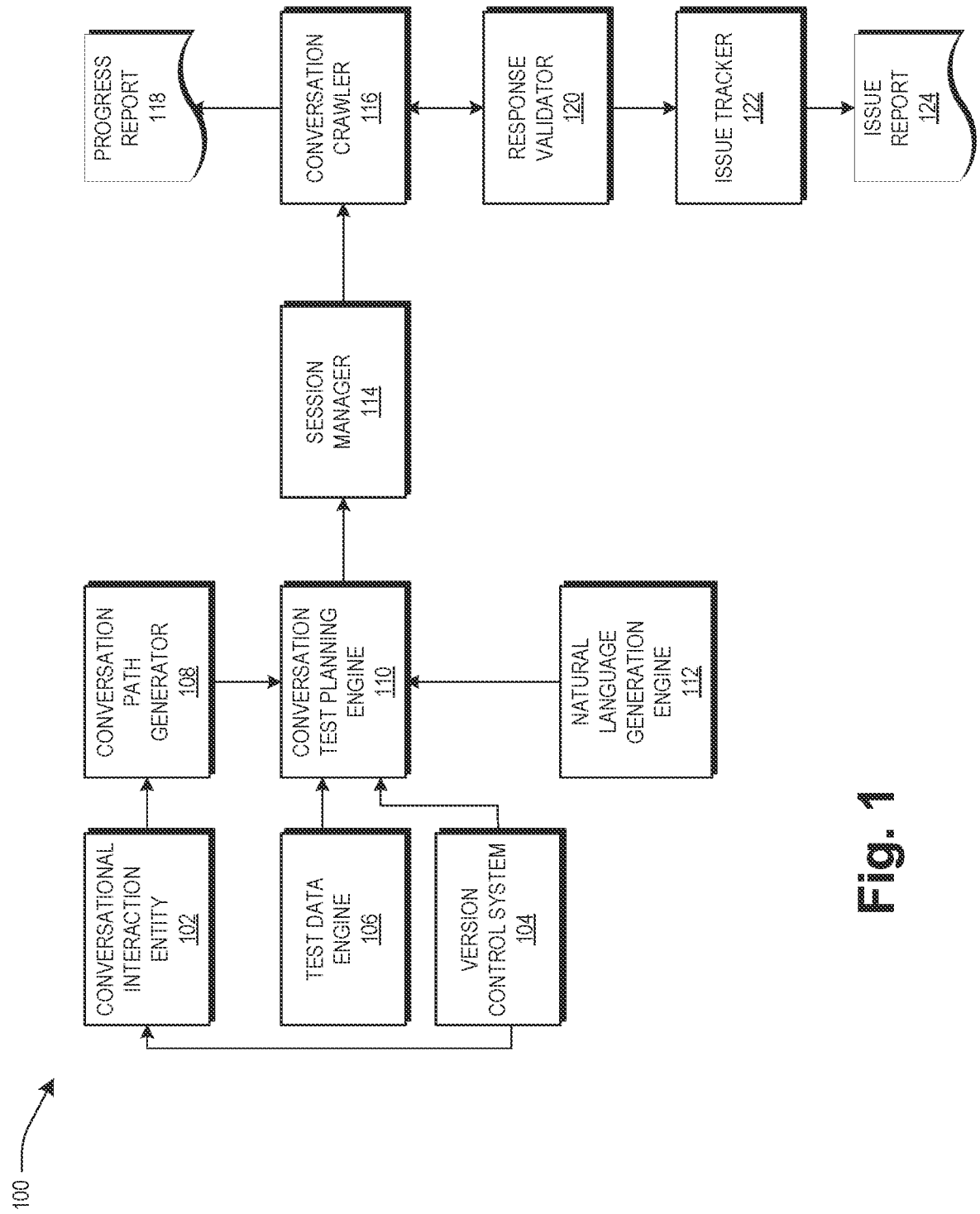
FIG. 1 is a diagram illustrating an example system implementing conversational interaction entity testing, according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented. One or more systems and/or techniques for testing a conversational interaction entity are provided. A conversational interaction entity employs natural language to attempt to identity an intent of a user or customer. The conversational interaction entity employs conversation paths that connect to the various intents. An intent for a conversational interaction entity may relate to information, a product, or a service offered by the organization.

For example, in the context of a provider of telecommunication services, an intent may relate to an accessory purchase. Parameters associated with the intent define the particulars of the request, such as accessory type, device type, or other suitable parameters. A user may provide as text or voice input a query, "What is the cost of a phone charger?" The conversational interaction entity has training phrases defined for the accessory purchase intent. The different training phrases may be related to different types of accessories and different ways of asking the question. The conversational interaction entity matches the user input to the training phrases to determine the accessory purchase intent.

In this example, the user specifies value of the parameter for the accessory type, "charger," in the query. The charger would be associated with a particular device type. Since the user did not specify the device type, the conversational interaction entity requires additional information. In some embodiments, a follow-up intent is associated as a child of the parent intent to allow the conversational interaction entity to determine the device type. In one example, the follow-up intent includes an action to access the account records of the user to determine the type of device owned by the user. The follow-up intent may include a response to the user with the candidate device type asking for confirmation, such as "Is the charger for your Android device?" In another example, the follow-up intent may provide the response, "For what type of device do you need a charger?" A second follow-up intent may analyze the user's response to match the user specified device type to training phrases related to device type. Parameters from a parent intent may be passed to follow-up intents. After identifying the device type from the user input, the conversational interaction entity may provide a message to the user verifying the device type. Once the parameters of the accessory purchase intent are determined, the conversational interaction entity initiates an external action, such as a database call or query, to retrieve the cost of the accessory. Additional intents may be provided to complete the purchase of the accessory using additional external actions.

The conversational interaction entity in this example may be modified to include an option for a new accessory offered by the provider. To implement the option for a new accessory, the intent may be modified to reflect training phrases, parameter values, or external actions associated with the new accessory.

In some embodiments, a first machine learning engine is trained based on test cases defined for conversation paths of the conversational interaction entity. The first machine learning engine identifies a conversation path associated with a revision to a code segment of a conversational interaction entity based on the training. Conversational phrases are generated for the conversation path to allow testing of each branch in the conversation path. The conversational interaction entity is tested using the conversation path and the conversational phrases to generate resultant intents. Resultant intents are compared to predetermined intents to verify functioning of the conversational interaction entity.

In some embodiments, an application programming interface (API) of the conversational interaction entity is called using the conversational phrase to generate the resultant intent. An issue report is generated for the conversational interaction entity responsive to the resultant intent not matching the predetermined intent. In some embodiments, a natural language generation engine is employed to generate an alternative conversational phrase. The conversational interaction entity may also be tested using the alternative conversational phrase. In some embodiments, an alternative conversational phrase that passes a confidence threshold is added to the training data for the conversational interaction entity.

Automatically generating a test case for a revised code segment avoids manual test development and deployment. Using an API to access the conversational interaction entity significantly reduces processing time and increases effectiveness compared to graphical user interface emulation techniques.

FIG. 1 is a diagram illustrating an example system 100 implementing testing of a conversational interaction entity 102, according to some embodiments. The conversational interaction entity 102 includes code segments that define user intents and inherently defines conversation paths based on the transitions between intents. The code segments of the conversational interaction entity 102 may be modified to add or modify user intents or to modify or add conversation paths. Each intent in a conversation path include training phrases, actions, parameters, or a response.

In some embodiments, the system 100 comprises a version control system 104, a test data engine 106, a conversation path generator 108, a conversation test planning engine 110, a session manager 114, a conversation crawler configured to generate a progress report 118, a response validator 120, and an issue tracker 122 configured to generate an issue report 124.

In some embodiments, the version control system 104 is configured to generate a build of the conversational interaction entity 102 when changes to the code segments are implemented. For example, a developer may add or modify parameters for an existing intent, add or modify seed phrases for an existing intent, add a new intent, add a new conversation path with multiple linked intents, or implement some other modification to the conversational interaction entity 102. In response to changes to code segments being committed, the version control system 104 generates an updated build of the conversational interaction entity 102.

The test data engine 106 is configured to provide seed phrases and context parameters for intents defined in the conversational interaction entity 102. For example, a conversation path may assume a particular state upon entry to the conversation path, such as account type, user type, device type, plan type, or some other context parameter. In some embodiments, the test data engine 106 stores seed phrases for the intents defined in the conversational interaction entity 102.

The conversation path generator 108 is configured to generate conversation paths or graphs associated with linked intents in the conversational interaction entity 102. In some embodiments, an intent defined in the conversational interaction entity 102 defines links to other intents that depend on context parameters associated with or response payload options provided by the individual interacting with the conversational interaction entity 102. The conversational path generator 108 defines conversation paths that traverse different combinations of the linked intents.

Figure 2:
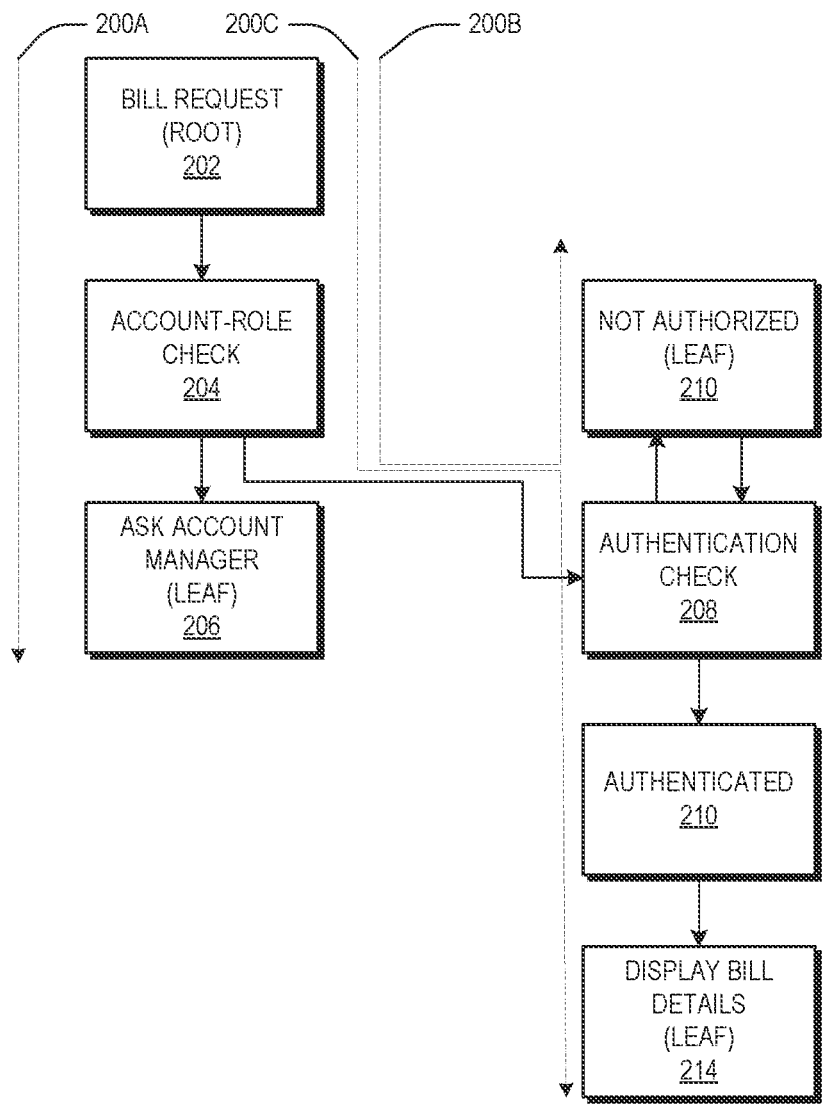
FIG. 2 is an illustration of a conversation path, according to some embodiments.

Referring to FIG. 2, an illustration of a conversation path 200 is provided, according to some embodiments. In the example, of FIG. 2, the conversation path 200 describes a user interaction for viewing a bill. At a bill request intent 202, the user's intent to view a bill is determined. For example, the user may provide as text or voice input the query, "Please show me my bill." The conversational interaction entity 102 compares the user input to training phrases associated with the bill request intent for the intent 202 and identifies a match.

At intent 204, the conversational interaction entity 102 checks the user's role associated with the account. Parameters for the account-role check intent 204 include account ID, user ID, and user role. For purposes of the example conversation path 200, it is assumed that the user logged into the account prior to initiating the chat session with the conversational interaction entity 102. If the user had not logged in previously, the conversational interaction entity 102 could query the user for account credentials at the intent 204.

If the user role is an account user at the intent 204, the conversational interaction entity 102 generates a response to the user at the intent 206 indicating that the user must contact the account owner to view the bill. Since no other options are available within the view bill conversation path 200, the intent 206 is a leaf intent and represents a termination point of the conversation.

If the user role is an account owner at the intent 204, the conversational interaction entity 102 performs an authentication check at intent 208. In some embodiments, the conversational interaction entity 102 may query the user for additional parameter information to authenticate the request, such as, "What is your account access PIN?" The parameter information for the intent 208 includes the user response to the authentication request.

If the authentication fails at the intent 208, the conversational interaction entity 102 generates an unauthorized request response at the intent 210 and terminates the conversation. If the authentication passes at the intent 208, the conversational interaction entity 102 designates authentication success at the intent 212 and displays the bill at the intent 214.

In the example conversation path 200 of FIG. 2, the conversational interaction entity 102 may be modified by adding or modifying a training phrase, an intent, a parameter, or some other aspect defined by the code segments of the conversational interaction entity 102. The conversation path 200 includes a first branch 200A defined by linked intents 202, 204, 206, a second branch 200B defined by linked intents 202, 204, 208, 210, and a third branch defined by linked intents 202, 204, 208, 210, 214. Testing of the conversation path 200 requires testing of all the defined branches.

Returning to FIG. 1, the conversation test planning engine 110 is configured to identify conversation paths affected by revisions to one or more code segments as identified by the version control system 104 and to generate conversations to test the affected conversation paths. In some embodiments, the conversation test planning engine 110 is a machine learning engine that receives the text of a revised code segment and predicts one or more conversation paths affected by the revised code segment.

Figures 3A, 3B:
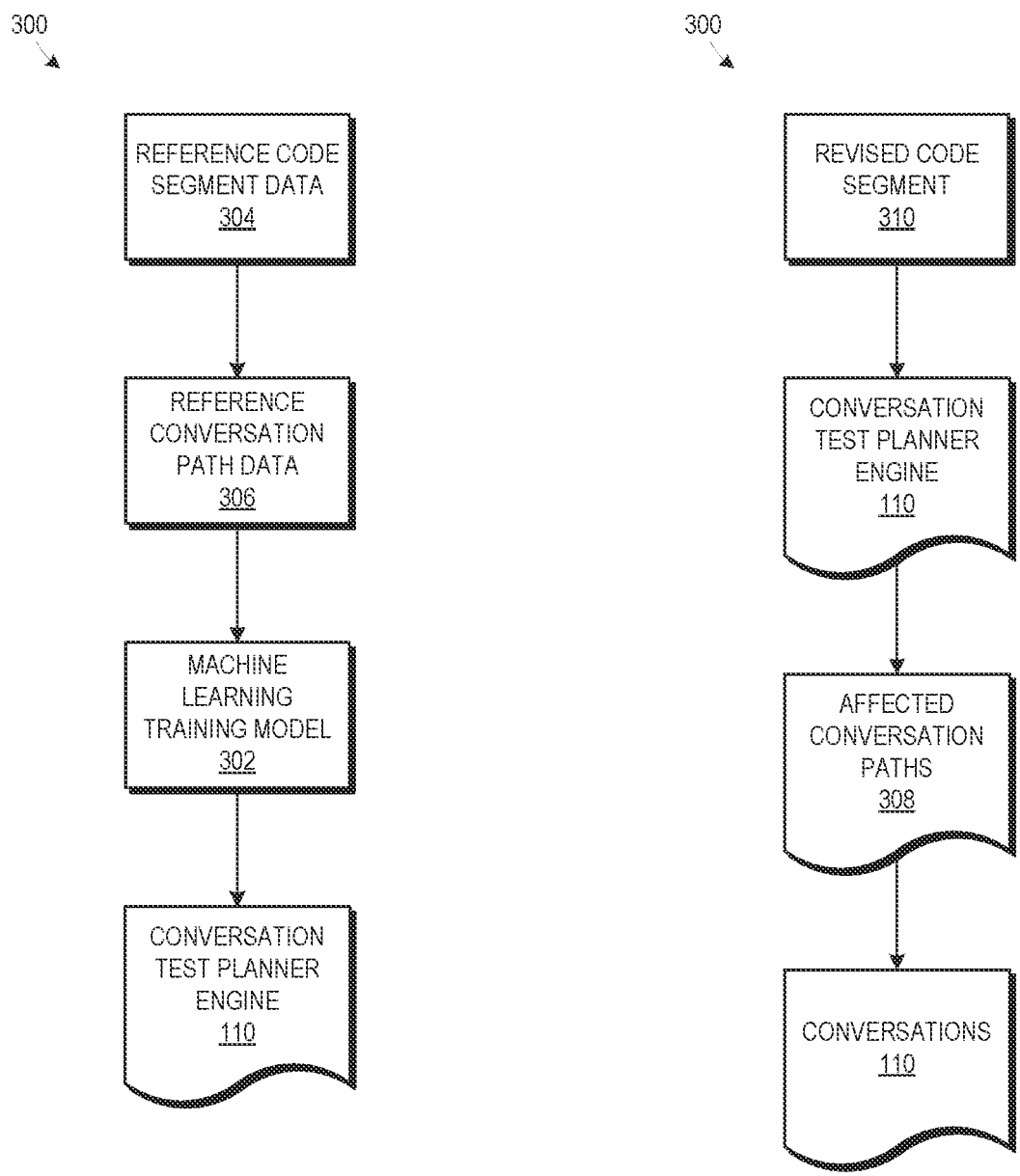
FIGS. 3A-3B are component block diagrams illustrating an example system for identifying affected conversation paths.

FIGS. 3A-3B illustrate examples of a system 300 for identifying affected conversation paths. FIG. 3A illustrates a training module 302 that trains machine learning model(s) to generate the conversation test planning engine 110. In an example, training data, including reference code segment data 304 and reference conversation path data 306, is input to the machine learning training module 302. In some examples, the reference conversation path data 306 comprises conversation paths linked to particular code segments in the reference code segment data 304. In some embodiments, the machine learning training model 302 receives the text of the reference code segments and the associated reference conversation paths as inputs and identifies patterns in the text of the reference code segments. The reference conversation path data 306 thus provides labels for the reference code segment data 304. The machine learning training module 302 trains the conversation test planning engine 110 to learn what conversation paths are affected by code segments based on the text of the code segments.

FIG. 3B illustrates an example of employing the conversation test planning engine 110 to generate affected conversation path data 308 associated with a revised code segment 310. The revised code segment 310 is provided as an input to the conversation test planning engine 110. In some embodiments, the conversation test planning engine 110 employs the text of the revised code segment 310 to match learned patterns and predict the affected conversation path data 308. In some embodiments, the conversation test planning engine 110 comprises a machine learning model, such as a neural network, that receives the text of the code segment and outputs the conversation paths it affects. The text of the code segments are used to train the conversation test planning engine 110 as opposed to employing static rules based on the file or function names. A static rule approach requires significant maintenance to adapt to code changes, since the names are not static and are prone to changes. Each name or variable change would require maintenance for the static rule system. Using the text of the code segment as input textual data for the conversation test planning engine 110, the conversation test planning engine 110 is able to understand the relationship between syntaxes and is able to generalize more effectively in situations where variables and/or names have changed.

Returning to FIG. 1, the natural language generation engine 112 is configured to generate alternative phrases for the conversations generated by the conversation test planning engine 110 to increase robustness of the conversation testing. In some embodiments, the natural language generation engine 112 is a machine learning engine that receives seed phrases in a conversation and generates alternative phrases that are similar to the seed phrases. In some embodiments, the conversation paths identified by the conversation test planning engine 110 are tested using seed phrases and or alternative phrases. In some embodiments, a robustness setting for the automatic testing of the conversational interaction entity 102 determines the degree to which alternative phrases are used. A higher robustness setting results in more alternative phrases being tested, thereby increasing the robustness of the testing.

FIGS. 4A-4B illustrate examples of a system 400 for identifying alternative conversational phrases. FIG. 4A illustrates a machine learning training module 402 performing machine learning model training to generate the natural language generation engine 112. In an example, training data, including relevant phrase data 404 and alternative phrase data 406, is input to the machine learning training module 402. In some examples, the relevant phrase data 404 includes phrases related to the industry in which the conversational interaction entity 102 is employed. For example, in a telecommunications environment, the relevant phrase data 404 may include conversational phrases related to phones, accessories, telecommunication services, or other industry applicable phrases. The alternative phrase data 406 may include alternative phrases linked to particular entries in the relevant phrase data 404. In some embodiments, the machine learning training model 402 receives the text of the relevant phrases and the associated alternative phrases as inputs and identifies patterns in the text of the relevant phrases. The machine learning training module 402 trains the natural language generation engine 112 to learn alternative language for relevant phrases.

FIG. 4B illustrates an example of employing the natural language generation engine 112 to generate alternative conversational phrases 408 associated with a seed phrase 410. The seed phrase 410, such as a seed phrase associated with an intent in a conversation path 200, is provided as an input to the natural language generation engine 112. In some embodiments, the natural language generation engine 112 employs the seed phrase and uses its learned patterns to generate the alternative conversational phrases 408. In some embodiments, a parameter, such as the robustness parameter, is used to determine the number of alternative conversational phrases 408 generated for the seed phrase 410.

Returning to FIG. 1, the session manager 114 receives the conversations generated by the conversation test planning engine 110 and/or alternative conversations generated by the natural language generation engine 112 and calls the conversational interaction entity 102 using the conversations to generate resultant intents that can be compared to the predetermined intents associated with the conversation paths to verify proper functioning of the conversational interaction entity 102. In some embodiments, a conversation comprises one or more conversational phrases that traverse the intents in a conversation path.

In some embodiments, the session manager 114 initiates a session with the conversational interaction entity 102 and calls an API of the conversational interaction entity 102 using a first conversational phrase in the conversation. The session manager 114 receives the response from the conversational interaction entity 102, and if the response matches a predetermined response, the session manager 114 proceeds with the conversation until a resultant intent for the conversation is reached at a leaf node of the conversation path. The session manager 114 repeats the process for all conversation paths and provides the results from the sessions to the conversation crawler 116 and the response validator 120.

By traversing the conversation paths using the conversational phrases provided by the conversation test planning engine 110, the session manager 114 identifies broken and hidden paths. The session manager 114 dynamically identifies all leaf or ending nodes and traverses the whole conversation to see whether all leaf nodes are reachable. In some embodiments, the session manager 114 identifies unreachable nodes in the conversation path and sends an exception for the associated conversation path to the issue tracker 122 for inclusion in the issue report 124. In some embodiments, the session manager 114 identifies if a conversation is failing or jumping along unexpected paths. The session manager 114 maintains a list of all nodes and intents that are expected to be visited. The conversation path generator 108 extracts the expected nodes from the conversational interaction entity 102 to generate an expected path of nodes. If the session manager 114 detects any deviations from the expected path, the deviation is included in the issue report 124. After the session manager 114 completes the traversal of a conversation path, the actual conversation path is compared to the expected conversation path and the session manager 114 flags the unvisited nodes as not reachable and marks those paths as broken in the issue report 124. If unexpected nodes are visited, it indicates that the conversation has traversed along unexpected paths and the conversation path is flagged in the issue report 124. In some embodiments, the processing of the session manager 114 is parallelized to allow concurrent testing of multiple conversation paths.

In some embodiments, a confidence metric is generated for an alternative phrases. For example, when processing an intent, the conversational interaction entity 102 generates a confidence metric that an input phrase satisfies the intent and activates the intent if the confidence metric is greater than a first threshold. In some embodiments, the conversational interaction entity 102 compares the input phrase to the seed phrases defined for the intent to generate the confidence metric. In some embodiments, the confidence metric for the alternative phrase is used to designate alternative phrases as new seed phrases for the intent. For example, if the confidence metric generated by an intent for an alternative phrase is greater than a second threshold, the session manager 114 designates the alternative phrase as a seed phrase for the associated intent. In some embodiments, the second threshold is greater than the first threshold so that new seed phrases are only added if a high confidence exists. In some embodiments, an alternative phrase with a confidence metric greater than the first threshold indicating it passed the intent, but less than the second threshold, the session manager 114 designates the alternative phrase as a candidate seed phrase and provides an entry in the issue report 124 to allow a developer to decide whether the alternative phrase should be added as a new seed phrase.

In some embodiments, alternative phrases that meet the first threshold are provided as positive reinforcement to the natural language generation engine 112, and alternative phrases that fall below the first threshold are provided as negative reinforcement to the natural language generation engine 112 to facilitate further training.

The conversation crawler 116 is configured to track progress of the session manager 114 through the conversations generated by the conversation test planning engine 110 and generate a progress report 118 illustrating the tested and untested conversation paths. In some embodiments, the progress report 118 comprises a color-coded graphical depiction of the conversation paths being tested by the conversation test planning engine 110. For example, untested paths may be shown in gray, tested paths with successful outcomes where the resultant intent matched the predetermined intent may be shown in green, tested paths with unsuccessful outcomes where the resultant intent did not match the predetermined intent may be shown in red, and tested paths that were successful but require further input from the developer may be shown in yellow. In some embodiments, the conversation crawler 116 sends the results from the session manager 114 to the response validator 120. In some embodiments, the results include the actual text response generated by the conversational interaction entity 102.

The response validator 120 is configured to perform a language validation by performing a spell check and/or a grammar check to identify language errors in the responses generated by the conversational interaction entity 102. In some embodiments, language validation errors may be indicated by the conversant crawler as a yellow paths in the progress report 118. In some embodiments, the response validator 120 sends exceptions for responses with potential errors to the issue tracker 122 for inclusion in the issue report 124.

The issue tracker 122 receives exceptions from the session manager 114 and/or the response validator 120 and generates the issue report 124 including the issues related to the conversation paths, such as unsuccessful conversation paths, validation errors, training issues, unreachable intents, or some other issue.

In some embodiments, conversation paths may have common paths that diverge into unique sub-baths that differ depending on the conversation. In one example, a first conversation path transitions to a second conversation path to accomplish an activity that is a prerequisite to completing the first conversation path. For example, a user may interface with the conversational interaction entity 102 to add international calling to the service plan, thereby invoking an international calling conversation path. In the international calling conversation path the conversational interaction entity 102 determines that the customer has an overdue bill. The conversational interaction entity 102 transitions to a bill pay conversation path to allow the user to pay the bill, and then returns to the international calling conversation path to complete the service upgrade. To test the conversational interaction entity 102 for a code segment update in the international calling service plan, the bill pay conversation path is also tested due to the link between the paths.

In some embodiments, each unique path is considered a separate conversation path for testing purposes. For example, in the conversation path 200 of FIG. 2, the branch 200B and the branch 200C have intents 202, 204, 208 in common, defining a common path. Intents 208, 210 define a unique sub-path and intents 208, 210, 214 define a unique sub-path. To completely test the conversation path 200 both common paths and unique sub-paths are tested. However, repetitively testing the common paths increases processing time to test the conversational interaction entity 102. To reduce processing time, the conversation test planning engine 110 defines conversations that separately test one or more of the sub-paths without repeating the testing of the common path. In some embodiments, a sub-path is tested by providing context information for the intent at the start of the sub-path. For example, to test the sub-path including intents 208, 210, the conversation test planning engine 110 starts the conversation at intent 208 and provides context information, such as account role, that would have been collected in the common portion of the path at intent 204. The conversation test planning engine 110 calls the conversational interaction entity 102 at intent 208 with the context information. The conversation includes incorrect authentication information causing the intent 208 to transition to the intent 210. The sub-path resultant intent for the conversation is the authorization failure at the intent 210. To test the sub-path including intents 208, 212, 214, the conversation test planning engine 110 starts the conversation at intent 208 and provides context information, such as account role, that would have been collected in the common portion of the path at intent 204. The conversation test planning engine 110 calls the conversational interaction entity 102 at intent 208 with the context information. In this example, the conversation includes the correct authentication information necessary to process the intent 208 and transition to the intent 212 and the intent 214. The sub-path resultant intent for the conversation is the display of the bill at the intent 214.

Figure 5:
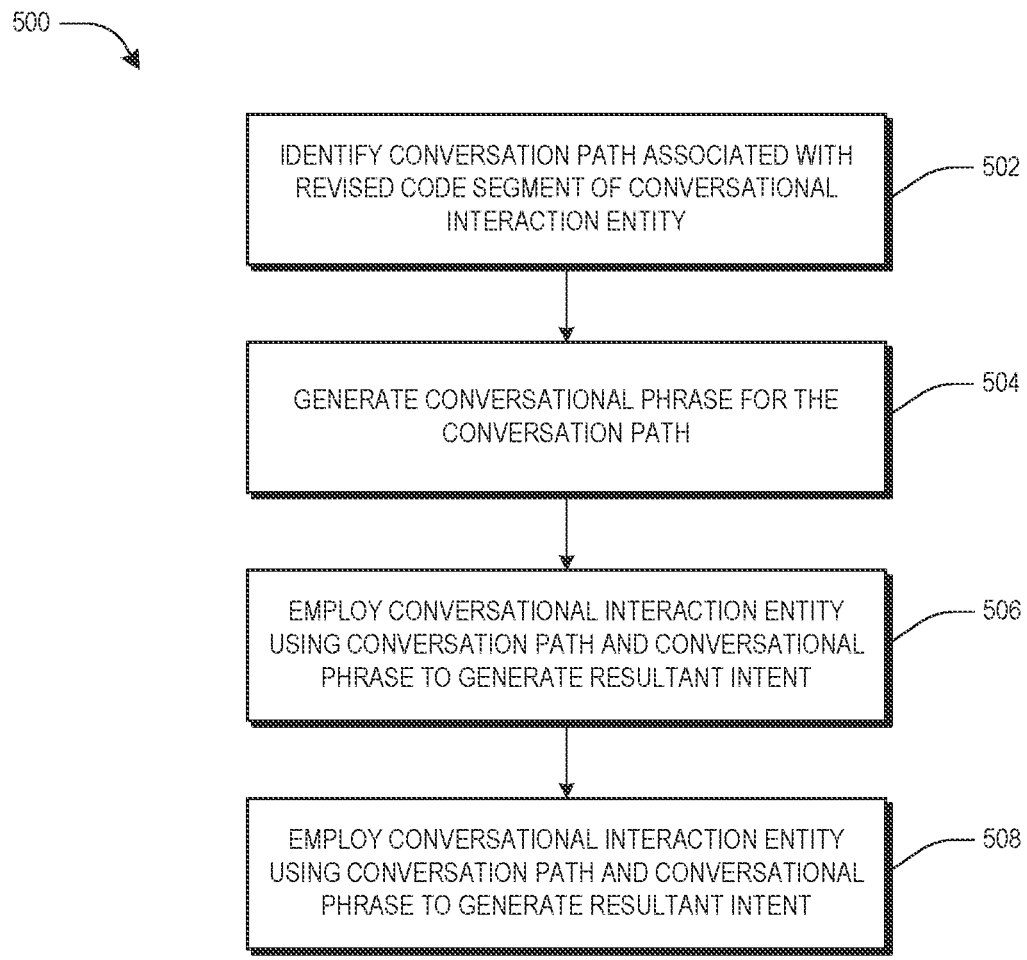

In the international calling example, it would be redundant to test the bill pay conversation path for each branch in the international calling conversation path. Context information may be provided to test the bill pay conversation path separately from the testing of the international calling conversation path to reduce overall processing time FIG. 5 is a flow chart illustrating an example method 500 for testing a conversational interaction entity is provided. At 502, a conversation path 200 associated with a revised code segment 310 of a conversational interaction entity 102 is identified. The conversation path 200 has a predetermined intent. At 504, a conversational phrase for the conversation path 200 is generated. At 506, the conversational interaction entity 102 is employed using the conversation path and the conversational phrase to generate a resultant intent. At 508, an issue report 124 for the conversational interaction entity 102 is generated responsive to the resultant intent not matching the predetermined intent.

The system 100 for implementing the testing of a conversational interaction entity 102 allows automated and dynamic testing of the conversational interaction entity 102 whenever a code revision is identified. Automated testing reduces testing time. Directly calling the API of the conversational interaction entity 102 to process the conversation and generate resultant intents significantly reduces processing times compared to graphical emulation techniques. The generation and use of alternative conversational phrases increases the robustness of the testing and provides opportunities to improve the conversational interaction entity 102 by adding seed phrases. Validation checking of the responses by the conversational interaction entity 102 reduces errors and improves the user experience.

Figure 6:
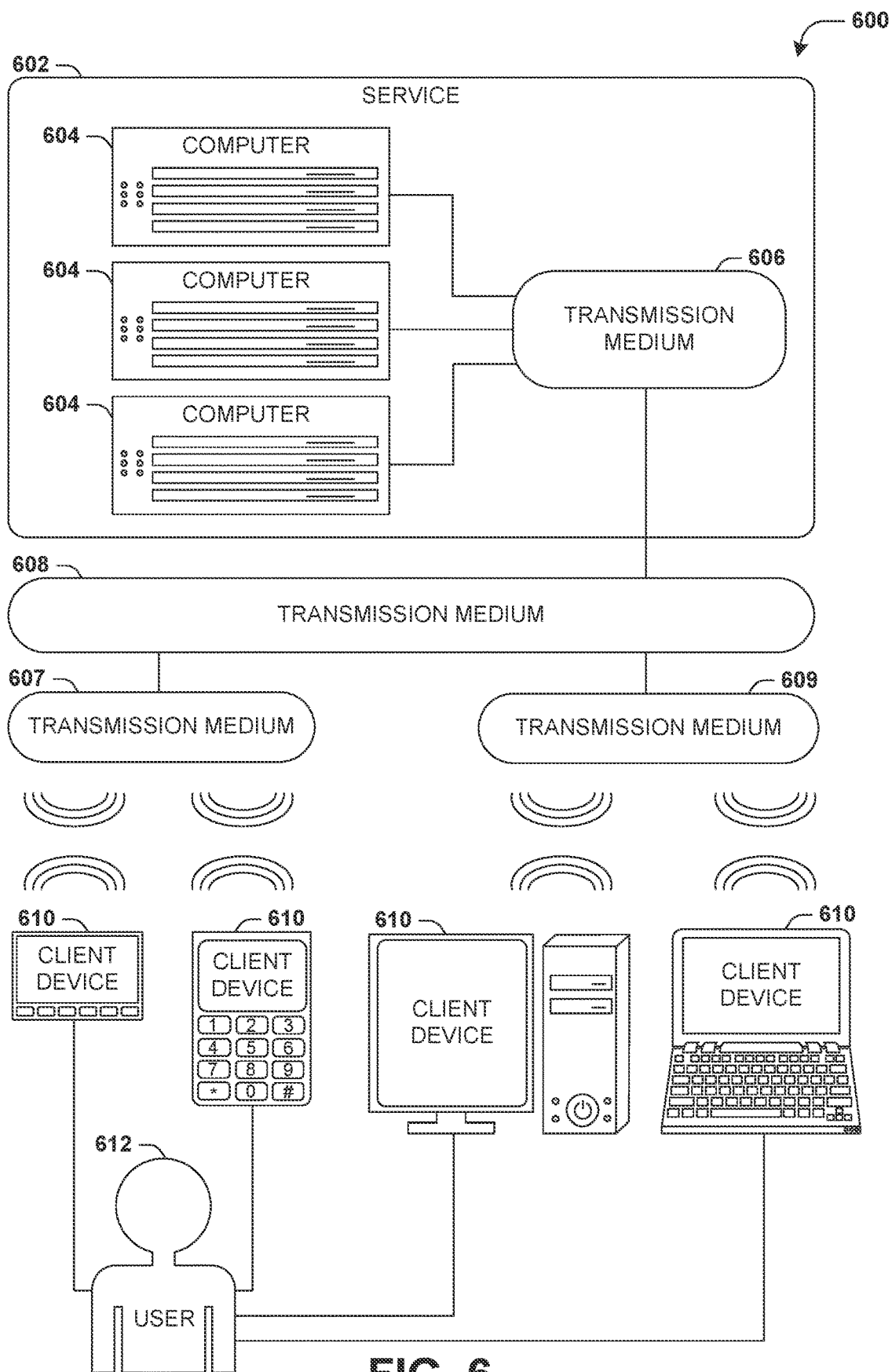
FIG. 6 is an illustration of a scenario involving various examples of transmission mediums that may be used to communicatively couple computers and clients.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 607 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums.

Figure 7:
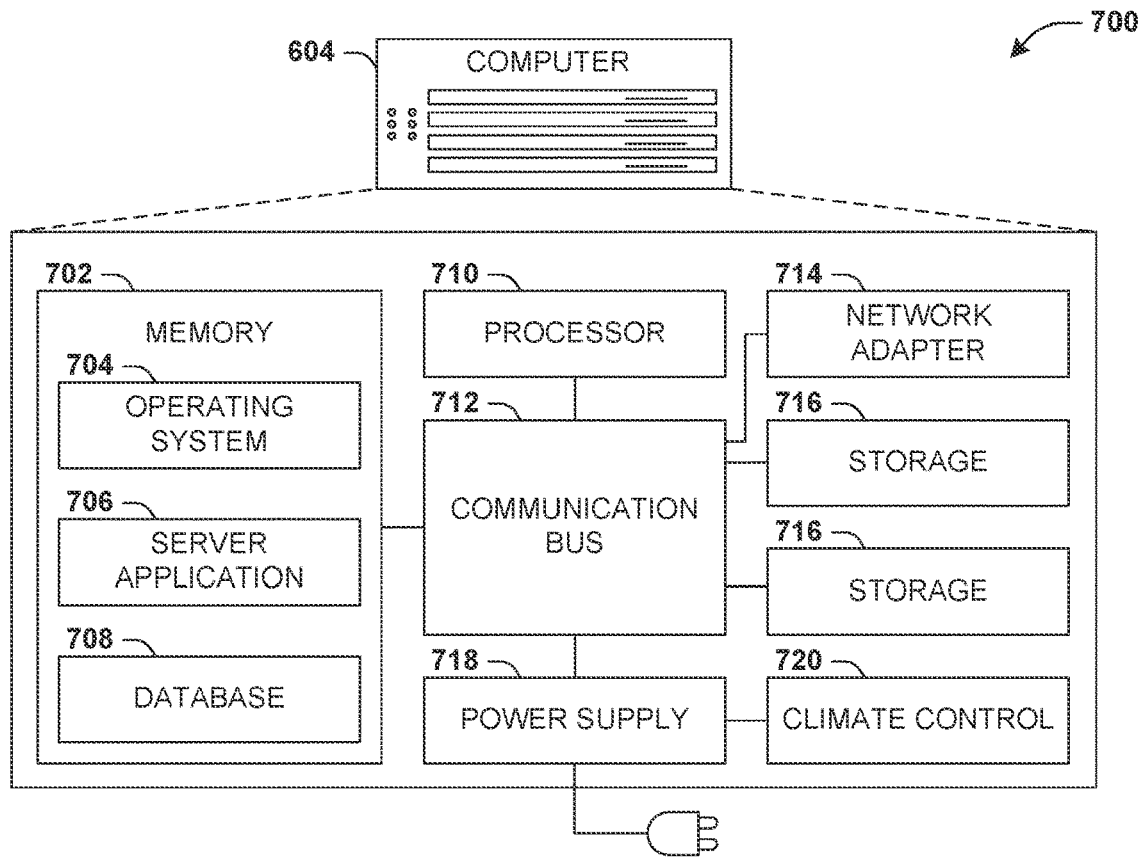
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
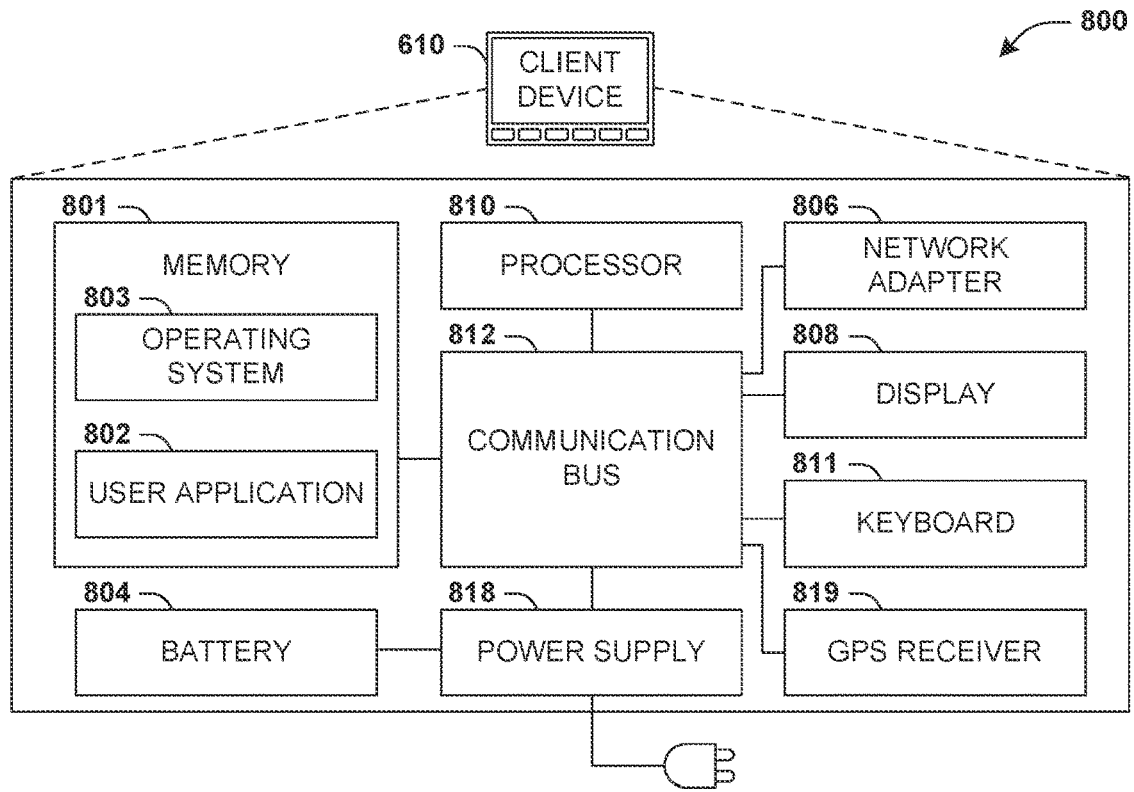
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
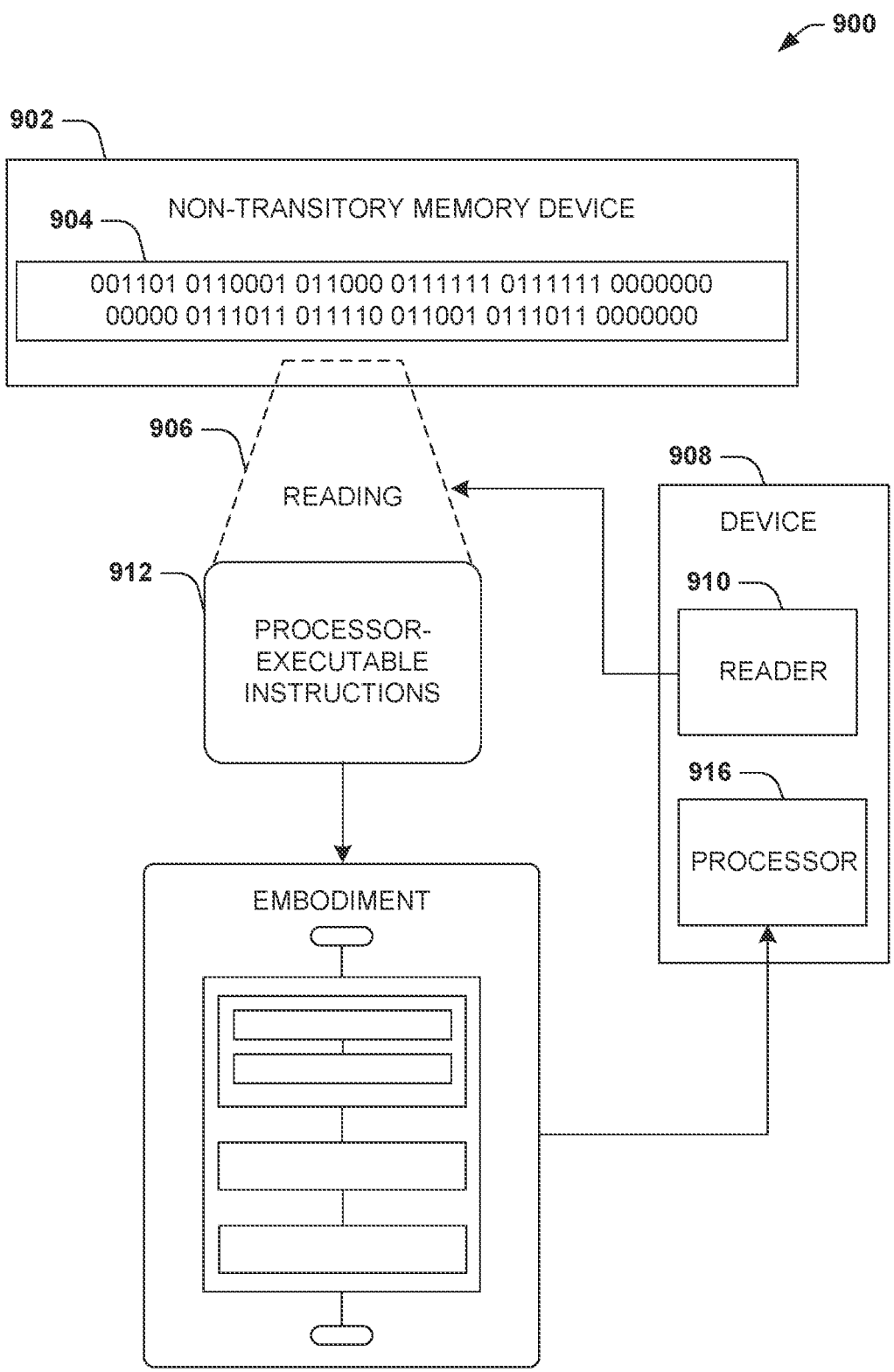
FIG. 9 is an illustration of a scenario featuring an example non-transitory machine-readable medium in accordance with one or more of the provisions set forth herein.

FIG. 9 is an illustration of a scenario 900 involving an example non-transitory machine-readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine-readable medium 902 stores machine-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 500 of FIG. 5, for example. In some embodiments, the processor-executable instructions 912 are configured to cause implementation of a system, such as at least some of the system 100 of FIG. 1, for example.

Figure 10:
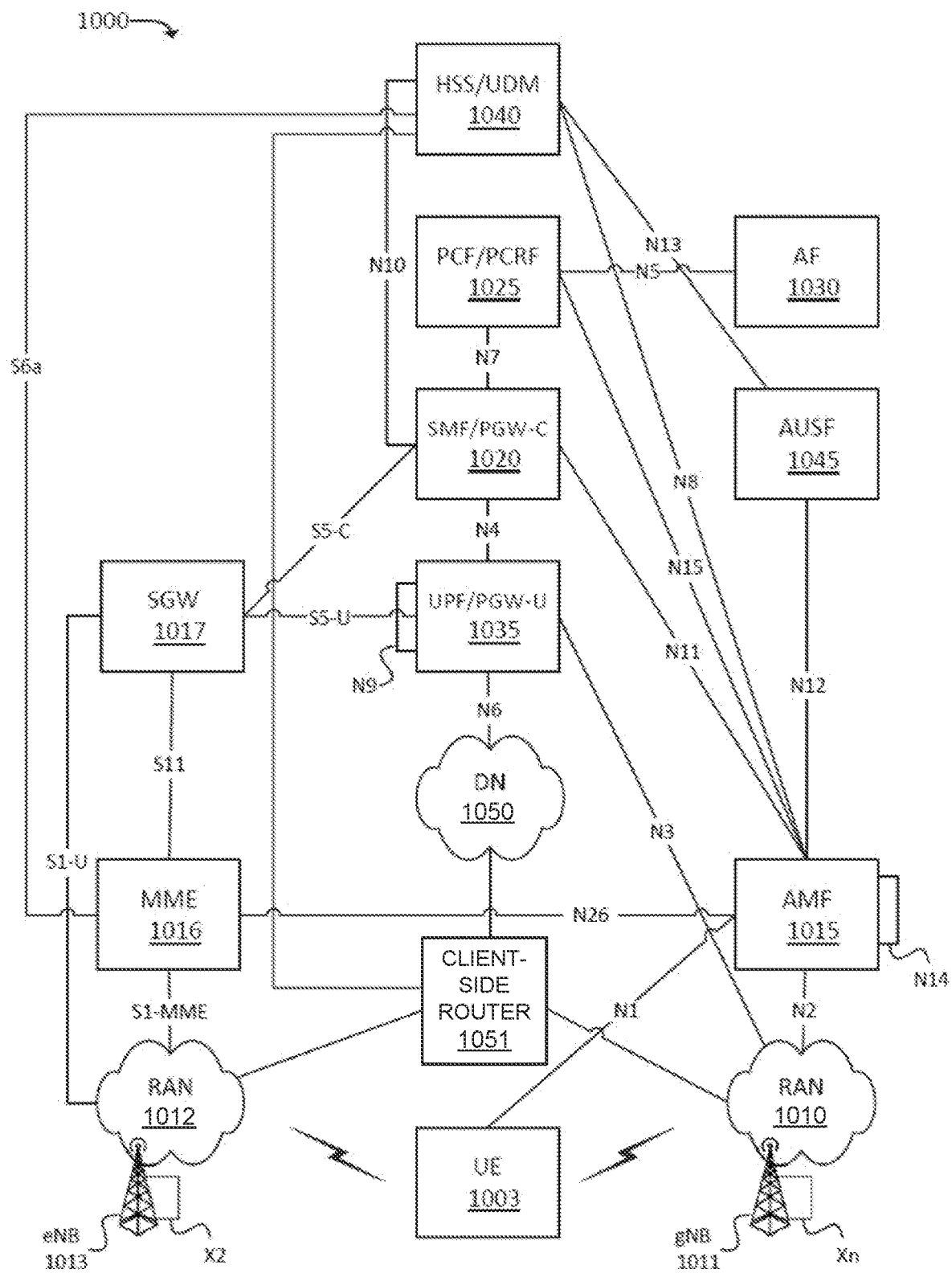
FIG. 10 is an illustration of an example environment in which at least a portion of the techniques presented herein may be utilized and/or implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as client-side router 1051.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The client-side router 1051 may include one or more devices, systems, VNFs, etc., that perform one or more operations described herein. For example, the client-side router 1051 may monitor and/or analyze video stream chunks and/or statuses associated with video stream chunks to check for quality issues and/or may deliver video stream chunks to UE 1003.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1003, and may determine which DU(s) 1103 should receive the downlink traffic. DU 1103 may include one or more devices that transmit traffic between a core network (e.g., via CU 1105) and UE 1003 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1003.

RU 1101 may include hardware circuitry (e.g., one or more RF transceivers, antennas, radios, and/or other suitable hardware) to communicate wirelessly (e.g., via an RF interface) with one or more UEs UE 1003, one or more other DUs 1103 (e.g., via RUs 1101 associated with DUs 1103), and/or any other suitable type of device. In the uplink direction, RU 1101 may receive traffic from UE 1003 and/or another DU 1103 via the RF interface and may provide the traffic to DU 1103. In the downlink direction, RU 1101 may receive traffic from DU 1103, and may provide the traffic to UE 1003 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1003, via a respective RU 1101.

For example, RU 1101-1 may route some traffic, from UE 1003, to MEC 1107-1 instead of to a core network (e.g., via DU 1103 and CU 1105). MEC 1107-1 may process the traffic, perform one or more computations based on the received traffic, and may provide traffic to UE 1003 via RU 1101-1. In this manner, ultra-low latency services may be provided to UE 1003, as traffic does not need to traverse DU 1103, CU 1105, and an intervening backhaul network between DU network 1100 and the core network. In some embodiments, MEC 1107 may include, and/or may implement some or all of the functionality described above with respect to the client-side router 1051.

According to some embodiments, a method is provided. The method includes identifying, by a processor, a conversation path associated with a revised code segment of a conversational interaction entity. The conversation path has a predetermined intent. A conversational phrase is generated by the processor for the conversation path. The conversational interaction entity is employed by the processor using the conversation path and the conversational phrase to generate a resultant intent. An issue report is generated by the processor for the conversational interaction entity responsive to the resultant intent not matching the predetermined intent.

According to some embodiments, identifying, by the processor, the conversation path includes employing a first machine learning engine to identify the conversation path.

According to some embodiments, the first machine learning engine is trained by the processor using reference code segments, each having an associated reference conversation path. The first machine learning engine is employed by the processor to identify the conversation path based on the revised code segment.

According to some embodiments, generating, by the processor, the conversational phrase includes receiving, by the processor, a first seed phrase associated with the conversation path and employing, by the processor, a second machine learning engine to generate the conversational phrase using alternative language for the first seed phrase.

According to some embodiments, a confidence metric associated with the alternative language and the resultant intent is determined by the processor. Responsive to the confidence metric exceeding a threshold, the alternative language is designated by the processor as a second seed phrase for the conversation path.

According to some embodiments, an entry in the issue report is generated by the processor responsive to the confidence metric associated with the alternative language not exceeding the threshold.

According to some embodiments, employing, by the processor, the conversational interaction entity using the conversation path to generate the resultant intent includes calling, by the processor, an application programming interface of the conversational interaction entity using the conversation path and the conversational phrase to generate the resultant intent.

According to some embodiments, a response is received by the processor from the conversational interaction entity for the resultant intent. A language validation is performed by the processor on the response. An entry in the issue report is generated by the processor responsive to the response failing the language validation.

According to some embodiments, performing, by the processor, the language validation includes performing at least one of a spell check or a grammar check.

According to some embodiments, a first conversation path is compared to a second conversation path by the processor to identify a common path that does not differ between the first conversation path and the second conversation path and a sub-path that differs between the first conversation path and the second conversation path. Context information for the sub-path is generated by the processor. The conversational interaction entity is employed by the processor using the context information to generate a sub-path resultant intent for the sub-path separate from the common path.

According to some embodiments, a processor is configured to execute instructions to facilitate performance of operations. The operations include identifying a revised code segment of a conversational interaction entity, identifying a conversation path associated with the revised code segment. The conversation path has a predetermined intent and a first seed phrase. An alternative conversational phrase is generated based on the first seed phrase. The conversational interaction entity is employed using the conversation path and the first seed phrase to generate a first resultant intent. The conversational interaction entity is employed using the conversation path and the alternative conversational phrase to generate a second resultant intent. An issue report is generated for the conversational interaction entity responsive to at least one of the first resultant intent or the second resultant intent conflicting with the predetermined intent.

According to some embodiments, the operations include determining a confidence metric associated with the alternative conversational phrase and the second resultant intent and, responsive to the confidence metric exceeding a threshold, designating the alternative conversational phrase as a second seed phrase for the conversation path.

According to some embodiments, the operations include generating an entry in the issue report responsive to the confidence metric associated with the alternative phrase not exceeding the threshold.

According to some embodiments, employing the conversational interaction entity using the conversation path and the first seed phrase to generate the first resultant intent includes calling an application programming interface of the conversational interaction entity using the conversation path and the first seed phrase to generate the first resultant intent. Employing the conversational interaction entity using the conversation path and the alternative conversational phrase to generate the second resultant intent includes calling the application programming interface of the conversational interaction entity using the conversation path and the alternative conversational phrase to generate the second resultant intent.

According to some embodiments, the operations include receiving a response from the conversational interaction entity for the first resultant intent, performing a language validation on the response, and generating an entry in the issue report responsive to the response failing the language validation.

According to some embodiments, performing the language validation comprises performing at least one of a spell check or a grammar check.

According to some embodiments, the operations include comparing a first conversation path to a second conversation path to identify a common path that does not differ between the first conversation path and the second conversation path and a sub-path that differs between the first conversation path and the second conversation path. Context information is generated for the sub-path, and the conversational interaction entity is employed using the context information to generate a sub-path resultant intent for the sub-path separate from the common path.

According to some embodiments, a non-transitory machine-readable medium storing instructions that when executed facilitate performance of operations including identifying a revision to a code segment of a conversational interaction entity. A first machine learning engine is employed to identify a conversation path associated with the revision. The conversation path has a predetermined intent. A conversational phrase is generated for the conversation path. An application programming interface of the conversational interaction entity is called using the conversation path and the conversational phrase to generate a resultant intent. An issue report is generated for the conversational interaction entity responsive to the resultant intent not matching the predetermined intent.

According to some embodiments, generating the conversational phrase includes receiving a first seed phrase associated with the conversation path and employing a second machine learning engine to generate the conversational phrase using alternative language for the first seed phrase.

According to some embodiments, the operations include receiving a response from the conversational interaction entity for the resultant intent, performing a language validation on the response, and generating an entry in the issue report responsive to the response failing the language validation.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any machine-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
a processor configured to execute instructions to facilitate performance of operations comprising:
identifying a conversation path associated with a revised code segment of a conversational interaction entity, the conversation path having a predetermined intent;
generating a conversational phrase for the conversation path;
employing the conversational interaction entity using the conversation path and the conversational phrase to generate a resultant intent;
determining that the resultant intent generated by the conversational interaction entity using the conversation path does not match the predetermined intent of the conversation path;
generating an issue report for the conversational interaction entity responsive to the determination that the resultant intent does not match the predetermined intent;

comparing a first conversation path to a second conversation path to identify a common path that does not differ between the first conversation path and the second conversation path and a sub-path that differs between the first conversation path and the second conversation path;
generating context information for the sub-path; and
employing the conversational interaction entity using the context information to generate a sub-path resultant intent for the sub-path separate from the common path.

2. The system of claim 1, wherein:
identifying the conversation path comprises:
employing a first machine learning engine to identify the conversation path.

3. The system of claim 2, the operations comprising:
training the first machine learning engine using reference code segments, each having an associated reference conversation path; and
employing the first machine learning engine to identify the conversation path based on the revised code segment.

4. The system of claim 1, wherein:
generating the conversational phrase comprises:
receiving a first seed phrase associated with the conversation path; and
employing a second machine learning engine to generate the conversational phrase using alternative language for the first seed phrase.

5. The system of claim 4, the operations comprising:
determining a confidence metric associated with the alternative language and the resultant intent; and
responsive to the confidence metric exceeding a threshold, designating the alternative language as a second seed phrase for the conversation path.

6. The system of claim 5, the operations comprising:
generating an entry in the issue report responsive to the confidence metric associated with the alternative language not exceeding the threshold.

7. The system of claim 1, wherein:
employing the conversational interaction entity using the conversation path to generate the resultant intent comprises:
calling an application programming interface of the conversational interaction entity using the conversation path and the conversational phrase to generate the resultant intent.

8. The system of claim 1, the operations comprising:
receiving a response from the conversational interaction entity for the resultant intent;
performing a language validation on the response; and
generating an entry in the issue report responsive to the response failing the language validation.

9. A non-transitory machine-readable medium storing instructions that when executed facilitate performance of operations comprising:
identifying a conversation path associated with a revised code segment of a conversational interaction entity, the conversation path having a predetermined intent;
generating a conversational phrase for the conversation path;
employing the conversational interaction entity using the conversation path and the conversational phrase to generate a resultant intent;
determining that the resultant intent generated by the conversational interaction entity using the conversation path does not match the predetermined intent of the conversation path;
generating an issue report for the conversational interaction entity responsive to the determination that the resultant intent does not match the predetermined intent;
comparing a first conversation path to a second conversation path to identify a common path that does not differ between the first conversation path and the second conversation path and a sub-path that differs between the first conversation path and the second conversation path;
generating context information for the sub-path; and
employing the conversational interaction entity using the context information to generate a sub-path resultant intent for the sub-path separate from the common path.

10. The non-transitory machine-readable medium of claim 9, wherein:
identifying the conversation path comprises:
employing a first machine learning engine to identify the conversation path.

11. The non-transitory machine-readable medium of claim 10, the operations comprising:
training the first machine learning engine using reference code segments, each having an associated reference conversation path; and
employing the first machine learning engine to identify the conversation path based on the revised code segment.

12. The non-transitory machine-readable medium of claim 9, wherein:
generating the conversational phrase comprises:
receiving a first seed phrase associated with the conversation path; and
employing a second machine learning engine to generate the conversational phrase using alternative language for the first seed phrase.

13. The non-transitory machine-readable medium of claim 12, the operations comprising:
determining a confidence metric associated with the alternative language and the resultant intent; and
responsive to the confidence metric exceeding a threshold, designating the alternative language as a second seed phrase for the conversation path.

14. The non-transitory machine-readable medium of claim 13, the operations comprising:
generating an entry in the issue report responsive to the confidence metric associated with the alternative language not exceeding the threshold.

15. The non-transitory machine-readable medium of claim 9, wherein:
employing the conversational interaction entity using the conversation path to generate the resultant intent comprises:
calling an application programming interface of the conversational interaction entity using the conversation path and the conversational phrase to generate the resultant intent.

16. The non-transitory machine-readable medium of claim 9, the operations comprising:
receiving a response from the conversational interaction entity for the resultant intent;
performing a language validation on the response; and
generating an entry in the issue report responsive to the response failing the language validation.

17. A method comprising:
identifying, by a processor, a conversation path associated with a revised code segment of a conversational interaction entity, the conversation path having a predetermined intent;
generating, by the processor, a conversational phrase for the conversation path;
employing, by the processor, the conversational interaction entity using the conversation path and the conversational phrase to generate a resultant intent;
determining, by the processor, that the resultant intent generated by the conversational interaction entity using the conversation path does not match the predetermined intent of the conversation path;
generating, by the processor, an issue report for the conversational interaction entity responsive to the determination that the resultant intent does not match the predetermined intent;
comparing, by the processor, a first conversation path to a second conversation path to identify a common path that does not differ between the first conversation path and the second conversation path and a sub-path that differs between the first conversation path and the second conversation path;
generating, by the processor, context information for the sub-path; and
employing, by the processor, the conversational interaction entity using the context information to generate a sub-path resultant intent for the sub-path separate from the common path.

18. The method of claim 17, wherein:
identifying, by the processor, the conversation path comprises:
employing, by the processor, a first machine learning engine to identify the conversation path.

19. The method of claim 18, comprising:
training, by the processor, the first machine learning engine using reference code segments, each having an associated reference conversation path; and
employing, by the processor, the first machine learning engine to identify the conversation path based on the revised code segment.

20. The method of claim 17, wherein:
generating, by the processor, the conversational phrase comprises:
receiving, by the processor, a first seed phrase associated with the conversation path; and
employing, by the processor, a second machine learning engine to generate the conversational phrase using alternative language for the first seed phrase.

* * * * *